3,017,273
ANIMAL FOOD FROM CLAM WASTE
John Marvin, Boston, and Edward E. Anderson, Lexington, Mass., assignors, by direct and mesne assignments, to Pet Kitchens, Inc., Providence, R.I., a corporation of Rhode Island
No Drawing. Filed Sept. 21, 1959, Ser. No. 841,003
8 Claims. (Cl. 99—7)

This invention relates to a novel composition of matter, the major portion of which is a clam waste or by-product and to the method for making the composition.

In the processing of sea clams for human consumption it has been found desirable to remove certain portions of the sea clam before the clams are further processed. It would therefore be desirable to be able to make use of the by-product or waste material resulting from the processing of sea clams.

With the increasing demand for processed and canned foods for animals and pets, it is necessary to seek out new sources of economical food to be processed, food which at the same time is high in protein and nutrient value, and which is also appealing and appetizing to the animals or pets which are to consume it.

It is therefore an object of this invention to provide a novel composition of matter, a major portion by weight of which is clam wastes which are otherwise not used. Another object of this invention is to provide compositions of the character described which are made into a suitable form for animal food. Yet another object is to provide a process for making the composition of the character indicated. These and other objects will become apparent in the detailed description given below.

So-called "sea clams" (*Mactra solidissima*) have been used for human foodstuffs for some 20 years or more. However, certain portions of these sea clams have always been discarded in the shucking plants during the processing of the sea clams for human consumption. Sometimes the necessity to dispose of these portions has resulted in considerable expense in the clam processing. The portions of the sea clam which are discarded are generally referred to as clam "bellies" and they include the stomachs, livers and other organs. There may be, of course, small amounts of muscles attached which are left in the preparation of the clams as foodstuffs. These parts of the clams, hereinafter referred to as "clam waste," have never before been used.

We have found that by processing these clam wastes with a thickener, a novel composition of material may be made which has the desired consistency, texture and taste appeal for a canned animal food.

In preparing the composition of this invention, the clam wastes are cooked with the thickener or binder until the desired consistency is attained. The resulting uniformly textured and consistent material is then packed into cans, the cans sealed in a manner to create a vacuum therein, and the material sterilized.

Inasmuch as it is necessary to prevent any bacterial or enzymatic degradation of the clam wastes, it is necessary to process this material soon after its extraction from the meat. The clam wastes may therefore be processed by the steps outlined above shortly after the clam waste is isolated, or the clam waste may be quick frozen and maintained in that condition until the processing steps are carried out.

In the processing of the clam waste to form the animal food of this invention it may, of course, be desirable to wash the clam waste to remove sand, shells and any excess salt. It may also be found desirable, although it is not necessary, to grind or otherwise macerate the material before mixing with the thickener.

The final thickened clam waste which comprises the composition of this invention may be described as a soft, gel-like material which is cohesive, but which may be easily spooned out or otherwise divided into discrete portions. It may be further described as having a consistency of or similar to existing pet foods. The final material has an even and uniform consistency and texture, and there are no bones or other hard or undigestible pieces in the material.

The binder or thickener used with the clam waste is added to absorb the excess liquid contained in the waste and to give the final composition the desired gel-like consistency defined above. The binder or thickener is present in a concentration equivalent from about 1 to about 10% by weight of the clam material, the amount used depending upon the character of the binder and upon that quantity required to give the desired consistency. It will, of course, be appreciated that some binders have a greater efficacy in the roles of absorbents and thickeners than others, and that the choice will also be dictated by the appeal which the binder may have for the animal to which the food is given.

The binder may be either a naturally occurring material or a synthetic material, or a combination of both. Suitable binders or thickeners may include, but are not limited to, cereals, meals, various starches and flours, gums such as gum arabic, locust bean gum, gum karaya and tragacanth, seaweed extractives, agar, pectins and the like. Among representative synthetic products which may serve as binders may be listed methyl cellulose, sodium carboxymethyl cellulose, propylene glycol esters of alginic acid and the like.

The thickeners are added to the clam waste in accordance with common practice of handling these materials as thickeners or binders. That is, some may be added before the heating step, while others are most conveniently added after the material has been heated or during the heating step. It is also within the scope of this invention to add these binders either in a dry form or as a water slurry. It is preferable, however, not to use more water in the preparation of the slurry than is required to form a smooth mixture since the clam wastes on heating are converted to a fairly free-flowing liquid and additional water would only require additional thickener to achieve the desired consistency.

As noted above, the clam wastes may be ground or otherwise macerated. If this step is to be included, the grinding may be achieved by passing the material through a chopper or grinder with a plate having passages ranging between one inch and one-quarter inch, or the material may be diced in a dicing machine between one inch and one-eighth inch dices or a combination thereof.

Heating of the clam waste converts it to a liquid-like material whether or not the material has been previously ground or macerated. Heating is carried out at a temperature ranging from about 160 to 190° F. until the clam wastes are liquefied and the thickener is evenly distributed and the final composition assumes a substantially uniform texture and consistency throughout. As pointed out above in describing the types of binders or thickeners employed, it is possible to add these either before heating, during the heating process or after the heating step has been essentially completed.

The thickened material is then transferred into suitable containers such as tin cans and packed under a vacuum by one of several known techniques. Thus the material may be transferred to the container at a proper initial closing temperature to assure a suitable vacuum in the cans after sealing and cooling. The thickened composition may also be steam-flow closed in the can or vacuum-closed in the can.

Finally the canned material is sterilized until all the bacterial and enzymatic bodies have either been destroyed or completely inactivated. This is performed usually at a temperature ranging from about 225 to 275° F. for a period from about 40 to 90 minutes. It will be appreciated that generally if the lower sterilization temperatures are used the time will be increased, inasmuch as the final attainment of sterilization is a time-temperature factor.

The following examples, which are meant to be illustrative and not limiting, are given to further describe the product and process of this invention.

Example I

Clam wastes made up of so-called clam bellies were heated to a temperature of about 160° F. until the material had been converted into a relatively free-flowing liquid. To this was slowly added a quantity of low-methoxy pectin, equivalent to 2% by weight of the clam wastes used. The mixture was maintained at the 160° F. temperature and slowly stirred until the pectin had been thoroughly mixed therein and the composition resulting was a thick liquid of uniform texture and consistency. This thick liquid was then introduced at a temperature of about 160° F. into a size 300 by 407 can (15 to 16 ounces), and the can sealed while the material was maintained at that temperature. Subsequently the material in the can was sterilized by exposing the can to superheated steam, maintained at 240° F. Sterilization was carried out for about 70 minutes.

When the can was subsequently opened the material contained therein was a dark gray, gel-like, finely textured material which could be spooned out or otherwise removed in discrete portions without any crumbling, but also without any adhering of the material to the spoon or to other utensils.

Example II

An animal food was prepared in the same manner as in Example I except that the thickener used was made up of equal parts by weight of the low-methoxy pectin of Example I and carboxymethyl cellulose. The composition was, as in the case of Example I, about 98% clam waste and 2% by weight thickener. The final product was treated as in Example I and was indistinguishable in appearance and texture from that of Example I.

Example III

A composition was made by mixing 90 parts by weight of clam waste with a mixture of one part by weight low-methoxy pectin and 9 parts by weight wheat bits. After a preliminary mixing the composition was heated with stirring to about 190° F. and maintained at that temperature until no further thickening was observed. The thickened composition was then put into a can such as that used in Example I and sealed by steam-flow methods which include the step of directing live steam across the top of the can as the lid was applied in order to replace the headspace air in the can with steam. The material was then sterilized at 240° F. for 70 minutes. When the contents of the can were subsequently examined it resembled that of the material made in accordance with Example I above.

Example IV 95 parts by weight of clam waste was heated and while the heating progressed, 5 parts by weight of gum tragacanth was slowly added with stirring. The material was heated to a final temperature of about 160° F. and maintained at that temperature until no further thickening was noted. The resulting composition was then handled in the same way as in Example I above.

It was found that gum tragacanth could be used in amounts equivalent to about 2 to 5% by weight of the clam waste.

It will be seen from the above that this invention provides a novel composition of matter formed of a material which has heretofore never been used and that the resulting composition has use as an animal food which is high in nutritive value and appealing to animals. Moreover, the food is completely free of any bones or other undesirable material and may be varied, by the choice of the binder or thickener, to obtain a desired consistency and flavor.

Small amounts of anti-oxidants, mineral constituents, coloring agents, vitamins, flavoring agents or other adjuvants may, of course, be incorporated in accordance with customary practice in preparing food and food products. In any event, the novel composition of this invention has as its essential constituent clam waste thickened with a binder.

We claim:
1. Process for preparing a food product, comprising the steps of heating clam waste material to form a uniform liquefied material and adding to said material a binder whereby said waste material is thickened to form a homogeneous gel-like, uniformly consistent and textured product when cooled.
2. Process in accordance with claim 1 further characterized by adding said binder before said heating step.
3. Process in accordance with claim 1 further characterized by adding said binder during said heating step.
4. Process in accordance with claim 1 further characterized by adding said binder in the form of a water slurry.
5. Process for preparing an animal food, comprising the steps of heating clam waste material to between about 160° and 190° F. to form a uniform liquefied material, and thickening the resulting liquefied material with a quantity of binder equivalent to about 1 to 10% by weight of said clam waste, whereby the resulting composition is a gel-like material of substantially uniform texture and consistency throughout when cooled.
6. Animal food prepared in accordance with the process of claim 5.
7. Process in accordance with claim 5 further characterized by macerating said claim waste material prior to said heating step.
8. Process for preparing an animal food, comprising the steps of heating clam waste material to between about 160° and 190° F., to form a uniform liquified material, thickening the resulting liquefied material with a quantity of binder equivalent to about 1 to 10% by weight of said claim waste to form a uniform homogeneous composition, canning the resulting thickened composition under vacuum, and sterilizing the canned product whereby all bacterial and enzymatic bodies present in the clam waste material are deactivated.

References Cited in the file of this patent

UNITED STATES PATENTS

| | | |
|---|---|---|
| Re. 18,048 | Hansen | Apr. 14, 1931 |
| 1,408,803 | Gamage | Mar. 7, 1922 |
| 2,767,094 | Frieden | Oct. 16, 1956 |

FOREIGN PATENTS

| | | |
|---|---|---|
| 681,052 | Great Britain | Oct. 15, 1952 |